(12) United States Patent
Wilder et al.

(10) Patent No.: US 11,305,242 B2
(45) Date of Patent: Apr. 19, 2022

(54) WATER CARBONATION UNIT AND CONTINUOUS WATER CARBONATION METHOD

(71) Applicant: STRAUSS WATER LTD, Or Yehuda (IL)

(72) Inventors: Haim Wilder, Ra'anana (IL); Gil Yardeni, Or-Yehuda (IL); Eyal Krystal, Kfar Saba (IL); Erez Cohen, Moshav Mishmeret (IL); Gil Kalmanovich, Kiryat-Ono (IL)

(73) Assignee: STRAUSS WATER LTD, Or Yehuda (IL)

( * ) Notice: Subject to any disclaimer, the term of this patent is extended or adjusted under 35 U.S.C. 154(b) by 310 days.

(21) Appl. No.: 16/340,763

(22) PCT Filed: Oct. 1, 2017

(86) PCT No.: PCT/IL2017/051107
§ 371 (c)(1),
(2) Date: Apr. 10, 2019

(87) PCT Pub. No.: WO2018/069913
PCT Pub. Date: Apr. 19, 2018

(65) Prior Publication Data
US 2020/0047137 A1 Feb. 13, 2020

(30) Foreign Application Priority Data

Oct. 10, 2016 (IL) .......................................... 248295

(51) Int. Cl.
*B01F 3/04* (2006.01)
*B01F 5/02* (2006.01)
(Continued)

(52) U.S. Cl.
CPC ........ *B01F 3/04808* (2013.01); *B01F 5/0256* (2013.01); *B01F 15/0293* (2013.01);
(Continued)

(58) Field of Classification Search
CPC .......................... B01F 3/04808; B01F 5/0256; B01F 15/0293; B01F 2003/04893; B67D 1/007; B67D 1/1422; C02F 1/68; C02F 2307/10
See application file for complete search history.

(56) References Cited

U.S. PATENT DOCUMENTS 1,645,320 A * 10/1927 De Armond ........ B01F 3/04815
99/323.2
5,842,600 A 12/1998 Singleterry et al.
(Continued)

FOREIGN PATENT DOCUMENTS

CN 105992636 A 10/2016
JP 2003026294 A 1/2003
(Continued)

OTHER PUBLICATIONS

English Translation for CN105992636 published Oct. 2016.*
English Translation for KR20150074551 published Jul. 2016.*

*Primary Examiner* — Anthony J Weier
(74) *Attorney, Agent, or Firm* — Vorys, Sater, Seymour & Pease LLP; William Klima

(57) ABSTRACT

Provided is a water carbonation unit including: at least one water feed and at least one pressurised carbon-dioxide feed; a merging duct extending between a first, closed end and a second end, the at least one water feed and at least one carbon-dioxide feed opening into said duct at said first end; said second end opening into a mixing chamber linked to a carbonated water outlet; the carbonated water outlet configured to restrict outflow of carbonated water from the cham-
(Continued)

ber to thereby maintain pressure within the chamber while carbonated water flows out of the carbonated water outlet.

19 Claims, 12 Drawing Sheets

(51) Int. Cl.
  *B01F 15/02* (2006.01)
  *C02F 1/68* (2006.01)
  *B67D 1/00* (2006.01)
  *B67D 1/14* (2006.01)
(52) U.S. Cl.
  CPC ........... *B67D 1/007* (2013.01); *B67D 1/1422* (2013.01); *C02F 1/68* (2013.01); *B01F 2003/04893* (2013.01); *C02F 2307/10* (2013.01)

(56) References Cited

U.S. PATENT DOCUMENTS

| | | | |
|---|---|---|---|
| 6,776,315 | B1 | 8/2004 | Laulom et al. |
| 8,177,197 | B1 | 5/2012 | Ergican |
| 8,636,268 | B2 * | 1/2014 | Fantappie ............. B01F 5/0688 261/79.2 |
| 9,227,161 | B2 | 1/2016 | Bormes et al. |
| 2006/0131332 | A1 * | 6/2006 | Khalaf ................. F04C 11/001 222/135 |
| 2007/0023935 | A1 | 2/2007 | Robards, Jr. et al. |
| 2007/0132114 | A1 | 6/2007 | Spiegel |
| 2011/0268845 | A1 * | 11/2011 | Fantappie ................ B01F 5/04 426/67 |
| 2012/0067427 | A1 | 3/2012 | Koslow |
| 2012/0225177 | A1 * | 9/2012 | Matsuoka ............ B01F 5/0653 426/477 |
| 2015/0314249 | A1 | 11/2015 | Cur et al. |
| 2016/0354734 | A1 * | 12/2016 | Bormes ................ B01F 5/0655 |

FOREIGN PATENT DOCUMENTS

| | | | |
|---|---|---|---|
| JP | 2003320231 | A | 11/2003 |
| KR | 20150074551 | * | 7/2015 |
| WO | 2009/043088 | A1 | 4/2009 |
| WO | 2014/041539 | A2 | 3/2014 |
| WO | 2015/118523 | A1 | 8/2015 |
| WO | 2015/124590 | A1 | 8/2015 |

* cited by examiner

WATER CARBONATION UNIT AND CONTINUOUS WATER CARBONATION METHOD

TECHNOLOGICAL FIELD

This disclosure is directed to a water carbonation system, unit and method particularly suitable for (but not limited to) domestic use.

BACKGROUND ART

References considered to be relevant as background to the presently disclosed subject matter are listed below:
WO 2014/041539
WO 2015/118523
U.S. Pat. No. 9,227,161
WO 2015/124590

Acknowledgement of the above references herein is not to be inferred as meaning that these are in any way relevant to the patentability of the presently disclosed subject matter.

BACKGROUND

Various carbonation systems are known. The majority of carbonation systems are based on batch-wise carbonation of water, typically determined by a finite volume of a carbonation chamber. Hence, in most cases, carbonation of a limited, defined, volume of water may be obtained in each cycle of carbonation, depending on the specific dimensions of the carbonation system.

Other systems which may permit continuous production of carbonated water are described, for example, in U.S. Pat. No. 9,227,161 and WO 2015/124590.

GENERAL DESCRIPTION

The present disclosure is directed to a new water carbonation technology. The carbonation technology of this disclosure that encompasses a carbonation unit, a carbonation method and a water dispensing device or system comprising such a unit or embodying the method, permits on-demand preparation and dispensing of carbonated water in a continuous manner (the term "technology" used herein is meant to encompass said unit, method and device). Thus, according to the technology of this disclosure, water is continuously carbonated during at least a portion of its flow from a water source to a dispensing outlet. The term "continuous" or "continuously" is meant to denote that the carbonation is not batch-wise and proceeds as long as there is demand for carbonated water and is not limited by the volume of an element of the unit in which the carbonation takes place, as in the case, for example, in the batch-wise unit and system disclosed in PCT publications WO 2014/041539 and WO 2015/118523, where the amount of the carbonated water to be dispensed upon each activation is limited by the volume of the carbonation chamber.

In accordance with the current disclosure, water, from a water source, is introduced into a duct (referred to herein as "merging duct") together with pressurized carbon dioxide, supplied from a source thereof. The water and the carbon dioxide are introduced into the merging duct from different, respective, water and gas feeds, typically angled with an acute angle to the direction of flow of the merged stream through the merging duct (thereby, through this flow direction, the water carbon dioxide feeds propel the flow of the merged stream through said duct). While flowing through the merging duct, these two streams mix and this mixture (i.e. a merged stream) then flows through the merging duct into a mixing chamber formed with a carbonated water outlet. The rapid flow of the mixture into the chamber causes a turbulent flow within the chamber that provides for a further mixture of the water with the carbon dioxide. The so produced carbonated water then continuously egresses through the carbonated water outlet positioned at a bottom portion of the mixing chamber. This outlet is configured to restrict the outflow of the carbonated water in the chamber to thereby maintain pressure within said chamber while the carbonated water flows out of the carbonated water outlet. It is the pressure that is maintained within the mixing chamber that propels the carbonated water out of the chamber.

Provided by a first aspect of this disclosure is a water carbonation unit that comprises at least one water feed, at least one pressurized carbon dioxide feed. These feeds open into a first, closed end of a merging duct that defines an elongated flow path between said first end and a second end of said duct. The duct may be generally curved, define a tortuous path or may be linear (in which case it defines a first axis extending from said first end to said second end). The water and the pressurized carbon merge during their flow between said first and second ends. The merging duct's second end opens into a mixing chamber that has a chamber outlet, configured to restrict the outflow of carbonated water from the chamber to thereby maintain pressure within the chamber, while permitting carbonated water to continuously flow out therefrom.

The carbonation unit of this disclosure thus defines a flow path between at least one water feed and at least one pressurized carbon dioxide feed, along the merging duct, into said chamber and out through the carbonated water outlet. Along this flow path, the water and the pressurized carbon dioxide are first merged while flowing along the merging duct and are then, typically forcefully, introduced into the mixing chamber in which the resulting turbulent flow of the mixture causes further, intimate mixture of these two components to thereby from the carbonated water that then egresses through the chamber outlet. Thus the eventual carbonation of the water is a product of (i) combined (relatively high speed) merged flow of water stream and pressurized carbon dioxide stream along the merging duct, and then (ii) continued mixing during the turbulent flow of the mixture in the chamber.

By one embodiment, the carbonated water outlet is constituted by a conduit extending from and in flow communication with the chamber's outlet. Said conduit may be configured to restrict the outflow of carbonated water from the chamber, thereby causing gas pressure to be maintained within the chamber. The flow through said conduit may be restricted through the dimensions, particularly the cross-sectional area thereof; for example, a narrow conduit causing resistance to flow and ensuring maintenance of gas pressure with said chamber.

Said conduit may have various general orientations according to various design considerations. In order to allow relative compactness, said conduit is typically oriented either parallel to a wall section of the chamber (where the chamber is formed with one or straight wall sections) or tangentially to the chamber's general curvature (in the case of a chamber with rounded internal walls).

The flow path described above, typically involves two main gas pressure decompression stages: (i) a first stage occurring along the merging duct; and (ii) a second stage across the carbonated water outlet; and along said conduit where the carbonated water outlet is constituted thereby.

A narrow conduit affects the size of the bubbles and hence the 'strength' of the carbonated water through a combination of (i) the break-down of bubbles that are larger than the passageway's dimensions as the carbonated water flows therethrough and (ii) affecting the pressure within the chamber.

By one embodiment, the carbonated water outlet is fitted with an adjustable valve configured for adjusting the flow resistance. Typically, such a valve adjusts flow resistance through changing widths of said conduit to thereby controls the 'strength' of the carbonated water. The adjustable valves typically comprises a valve member disposed within a valve seat, the valve member being axially displaceable along an axis to thereby change the width of a clearance formed between external faces of the valve member and internal faces of the valve seat. The valve member's external faces typically have portions that are parallel to internal faces of the valve seat (i.e. the contours of the external faces of the valve member match the contours of internal faces of the valve seat).

An exemplary configuration is one that comprises a valve member disposed within a bore that extends along a second axis between an upstream end, adjacent the outlet of the chamber and a downstream end. Said conduit is defined between outer face of the valve member and internal walls of the bore. Through its displacement within the bore the valve member controls the width of said conduit. By one embodiment, the valve member can axially displace within said bore along said second axis and through such displacement it imparts a changed on the dimensions of said duct. For example, the walls of said bore may diverge from the bores upstream end towards said downstream end, the valve member's outer face may be generally parallel to the walls of said bore and consequently, the axial displacement will cause a change in the width of the conduit (defined by and formed between said outer face and said walls).

By one embodiment, the carbonation unit includes a unit outlet (that in use links the unit and channels the carbonated water to the dispensing outlet of the water appliance or system in which it is incorporated). The unit outlet is linked to and in flow communication with the carbonated water outlet at the downstream end of the conduit. An exemplary arrangement is one in which the valve member is formed with an annular groove that has at least a portion that is aligned with the unit outlet that opens into said bore. This groove, thus, functions to channel the carbonated water flowing from said conduit to said outlet.

By another embodiment, the valve seat is defined by the portion of the chamber adjacent the carbonated water outlet, typically with the walls of the valve seat having internal faces that converge toward the carbonated water outlet.

Although the carbonation unit may be fitted with adjustable valves, as described hereinabove, it is also contemplated that the valves are fixed, namely the valves are pre-adjusted or pre-fixated to have a non-variable clearance for carbonated water passage.

In some embodiments, the water carbonation unit may further comprise at least one auxiliary adjustable valve, located downstream to the adjustable valve. The auxiliary valve may have a structure similar or different from said adjustable valve. According to some arrangements, the at least one auxiliary adjustable valve may be located adjacent the adjustable valve.

The chamber may have a variety of different geometrics although internal walls that are formed to define the general rounded shape internal volume, such as a sphere or a space having an oval cross-section. While the chamber is not limited to this structure, this appears to be optimal in order to permit efficient turbulent flow for effective mixing of the water and the carbon dioxide in a relatively compact space.

The merging duct has typically walls that diverge at said duct's second end toward the carbonation chamber. Such diverging walls are typically rounded and formed such that they seamlessly merge with the walls of said chamber.

By an embodiment of this disclosure, the at least one water feed and at least one pressurized carbon dioxide feed are configured to introduce the respective water and gas streams and an angle to the general direction of flow defined by the merging duct and at an angle to one another. Where the duct is linear and extending along said first axis, said water and gas feeds are independently configured to introduce respective water and gas streams that are angled with respect to the first axis and also one to the other. Such a directed stream may induced by linear and so angled terminal segments of the water feed and of the gas feed. As noted above, the angle between each of the terminal segments and the direction of the merged water and gas streams within the merging duct (e.g. the angle between the terminal segments and the first axis) is each an acute angle, which in some embodiments may be each independently at an angle of 20-70 degrees, preferably 25-65, 30-60, 35-55, and even 40-50 degrees. Thus, the angle between the terminal segment of the water feed and the terminal segment of the carbon dioxide feed is, accordingly, between 40 to 140 degrees.

The continuous carbonation method of this disclosure comprises continuous mixing of pressurized carbon dioxide and water to produce carbonated water and dispensing of the produce carbonated water. The mixing has (i) a first merging step of concomitant flow of a water stream and of a pressurized carbon dioxide stream, fed into a first end of a merging duct to a second end that opens into a mixing chamber; and (ii) a second mixing step of turbulent flow of the gas and water within the chamber. The gas pressure that is maintained within the chamber propels the egress of the carbonated water out of the chamber is permitted to egress continuously out of the chamber.

In another aspect, the disclosure provides a water dispenser comprising a carbonation unit as described herein. The water dispenser may further comprise at least one (e.g. one, two, or more) auxiliary adjustable valve, located downstream to the carbonation unit. Such auxiliary adjustable valves may be located at any location between the carbonation unit and a dispensing outlet of the water dispenser, and are configured to cooperate with the adjustable valve of the carbonation unit to permit fine-tuning of the pressure within the carbonation unit and along a carbonated water dispensing line.

In some embodiments, said at least one auxiliary valve is located adjacent the dispensing outlet of the water dispenser. In other embodiments, where the dispenser comprises two or more auxiliary valves, any one of the auxiliary valves may be positioned along a carbonated water dispensing line, extending from the carbonation chamber to the dispensing outlet.

According to some embodiments, at least one of the auxiliary valve is located adjacent the dispensing outlet of the water dispenser and may be user-operated.

The dispenser may further comprise, according to some embodiments, a mixing unit, linked to feed lines for feeding non-carbonated hot water and non-carbonated cold water to a dispensing outlet of the water dispenser. The mixing unit may be provided with a cold water entry port and a hot water entry port, such that controlled feeding of cold and hot water and mixing thereof in the mixing unit permits dispensing water at a desired temperature.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3A shows a unit where the valve member is fully advanced towards the chamber outlet providing for a narrow carbonated water conduit; while in FIG. 3B it is retracted to provide for a wider conduit.

DETAILED DESCRIPTION OF EMBODIMENTS

Figure 1A:
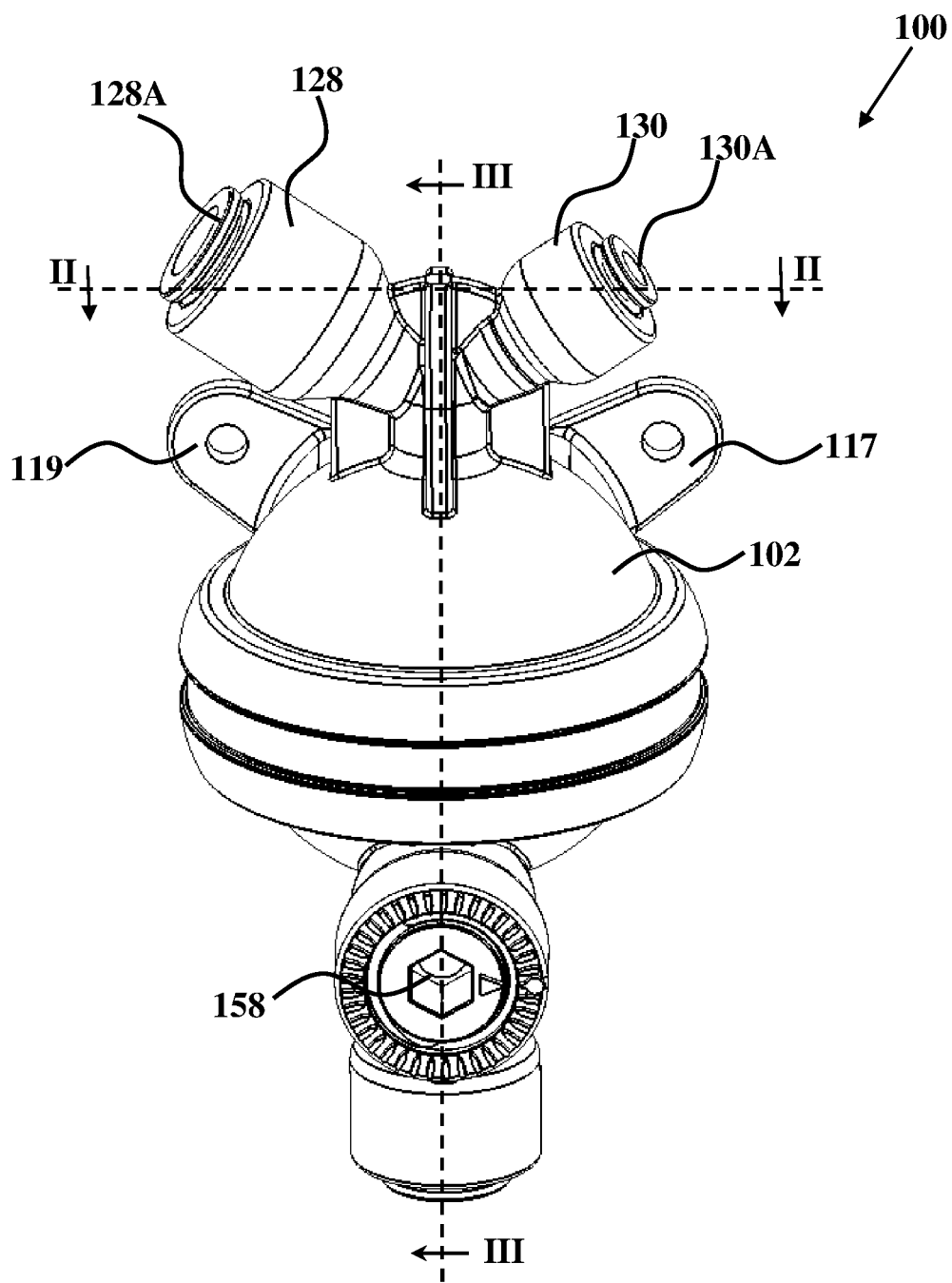
FIGS. 1A and 1B are respective front and side views of a carbonation unit according to an embodiment of this disclosure.
Figure 1B:
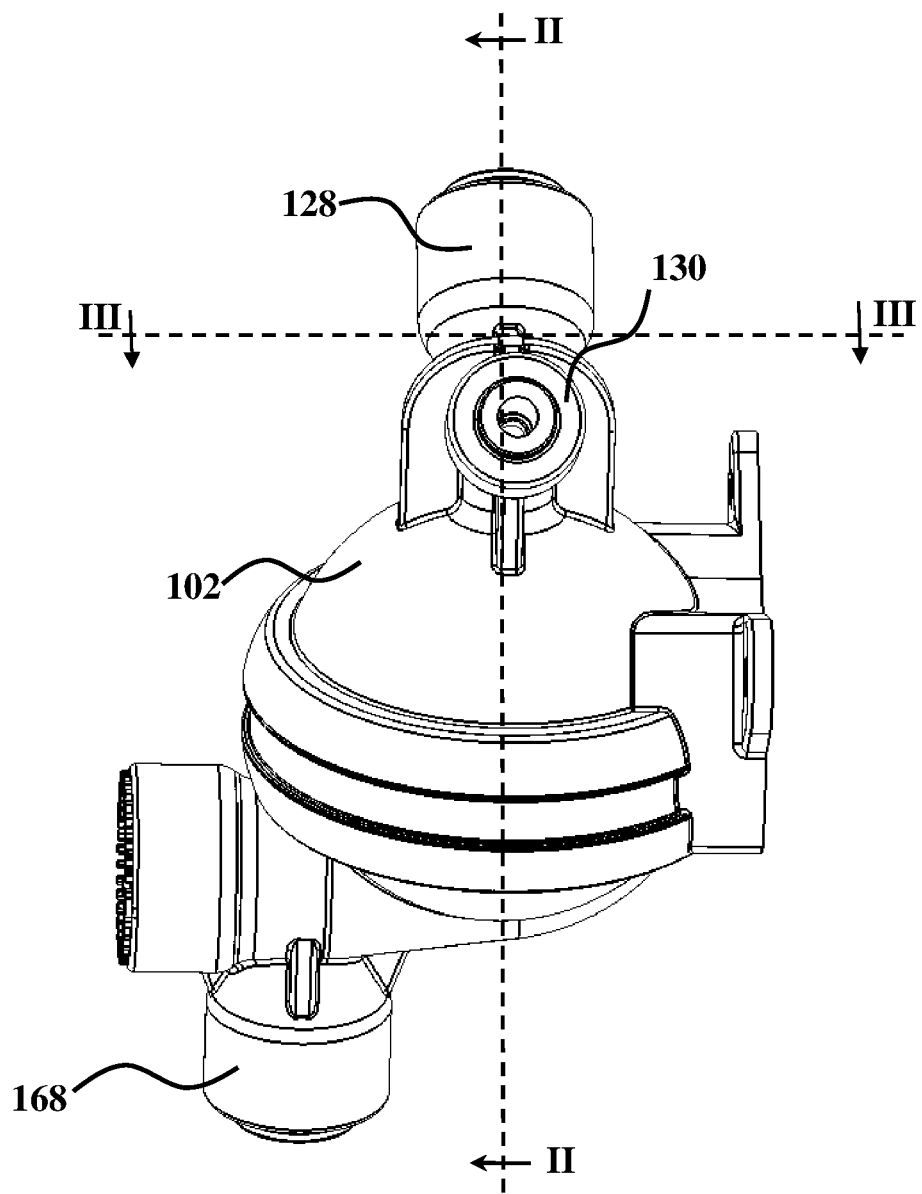
Figure 2:
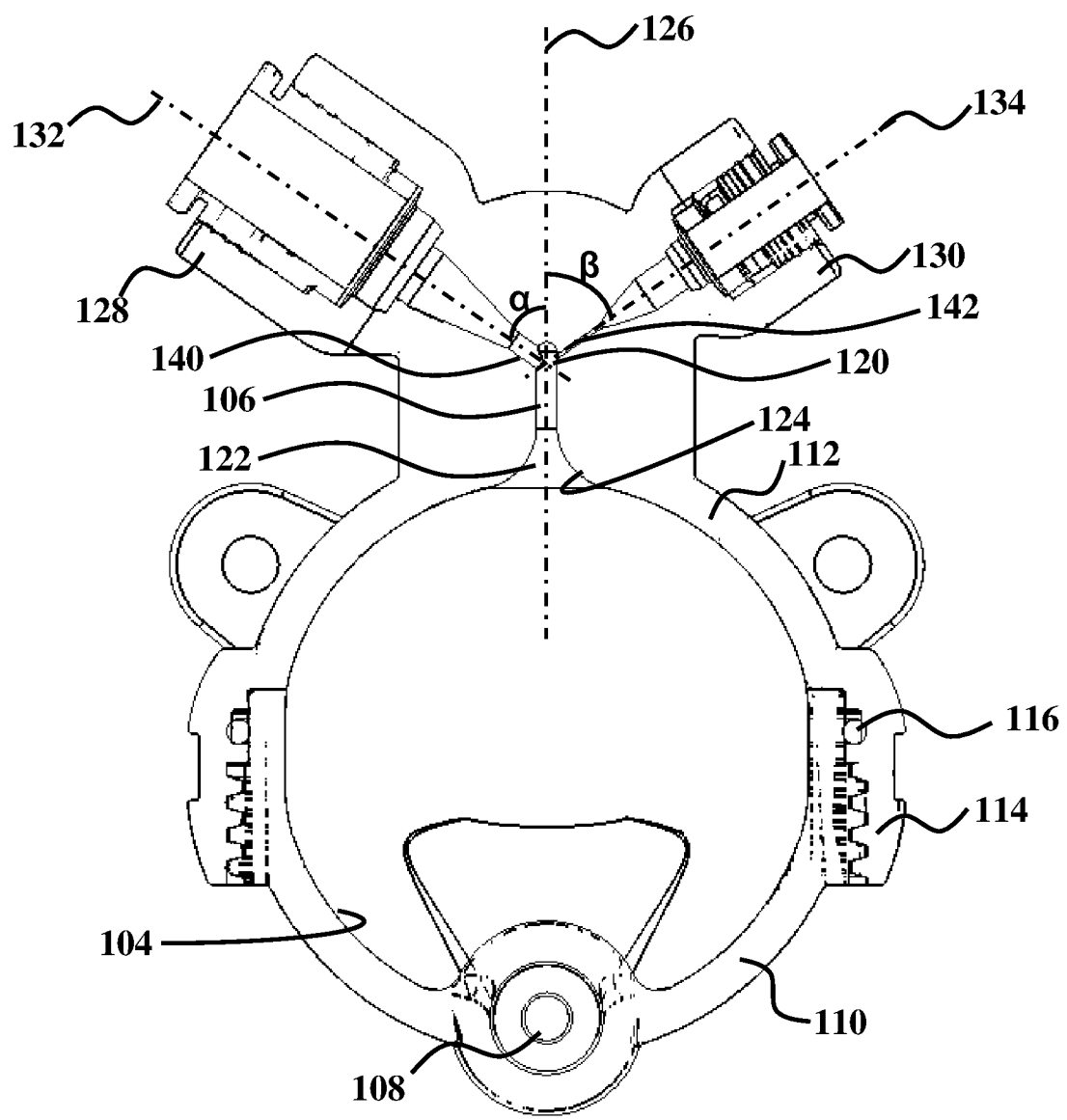
FIG. 2 is a longitudinal cross-section along lines II-II in FIGS. 1A and 1B.

The annexed drawings show specific exemplary embodiments of a carbonation unit of this disclosure.

The carbonation unit 100 has a mixing chamber 102 with overall spherical internal wall faces 104, fed from its top by a merging duct 106 and having at its bottom a chamber outlet 108. It should be noted, however, that while the chamber outlet 108 needs to be at a bottom portion of the chamber (to thereby ensure that the pressure within the chamber functions to propel the carbonated water out of the chamber outlet), the merging duct may not necessary be linked to the chamber 102 from is top and may, by some embodiment be connected to the chamber's side or at any other angle, e.g. dictated by overall appliance/system design considerations.

The chamber 102 is assembled out of two matching hemispheres 110, 112 which are screw-fitted by a matching screw threading arrangement 114 with a fluid-tight seal being maintained by circumferential O-ring 116.

Carbonation unit 100 is provided with two lugs 117, 119 for fixing it to the frame of a water dispensing device or system.

Merging duct 106 has a first closed end 120 and a second opposite end 122 which formed with diverging walls 124 that seamlessly merge with the internal walls 104 of chamber 102. The merging duct 106 of this embodiment is generally linear and extends along a first axis 126. As also generally noted above, the merging duct may also have other configurations, such as being curved, spiral, tortuous, etc. First end 120 of duct 106 is in fluid communication with water feed 128 and gas feed 130 which in use connect, through their respective external fitments 128A and 130A to respective water and pressurized carbon dioxide sources.

The terminal segments 140, 142 of the respective water and gas feeds 128, 130 define each a respective axis 132, 134 at respective angles $\alpha$, $\beta$ of about 45° with respect to the first axis 126. As can be appreciated, each of $\alpha$ and $\beta$ may, independently, be 20°, 25°, 30°, 35°, 40°, 45°, 50°, 55°, 60°, 65°, 70°; accordingly the angle between axes 132 and 134 ($\alpha+\beta$) may typically range between 40° and 140°. Also the angles $\alpha$ and $\beta$ are approximately the same in this embodiment and by another embodiment may be different.

It should further be noted that while by this embodiment there is a single water feed and a single pressurized carbon dioxide feed, by other embodiments there may be independently, more than one water inlet and more than one gas inlet; for example, there may be a pair of water inlets and a pair of gas inlets radially shifted about axis 126.

The diameters of the terminal segments 140 and 142 can be the same or different, and may be tailored to the desired flow rate and/or viscosities of the water and gas, respectively. The respective diameters are configured such, so as to provide for proper relative inflow of these two components to ensure proper carbonation.

Figure 3A:
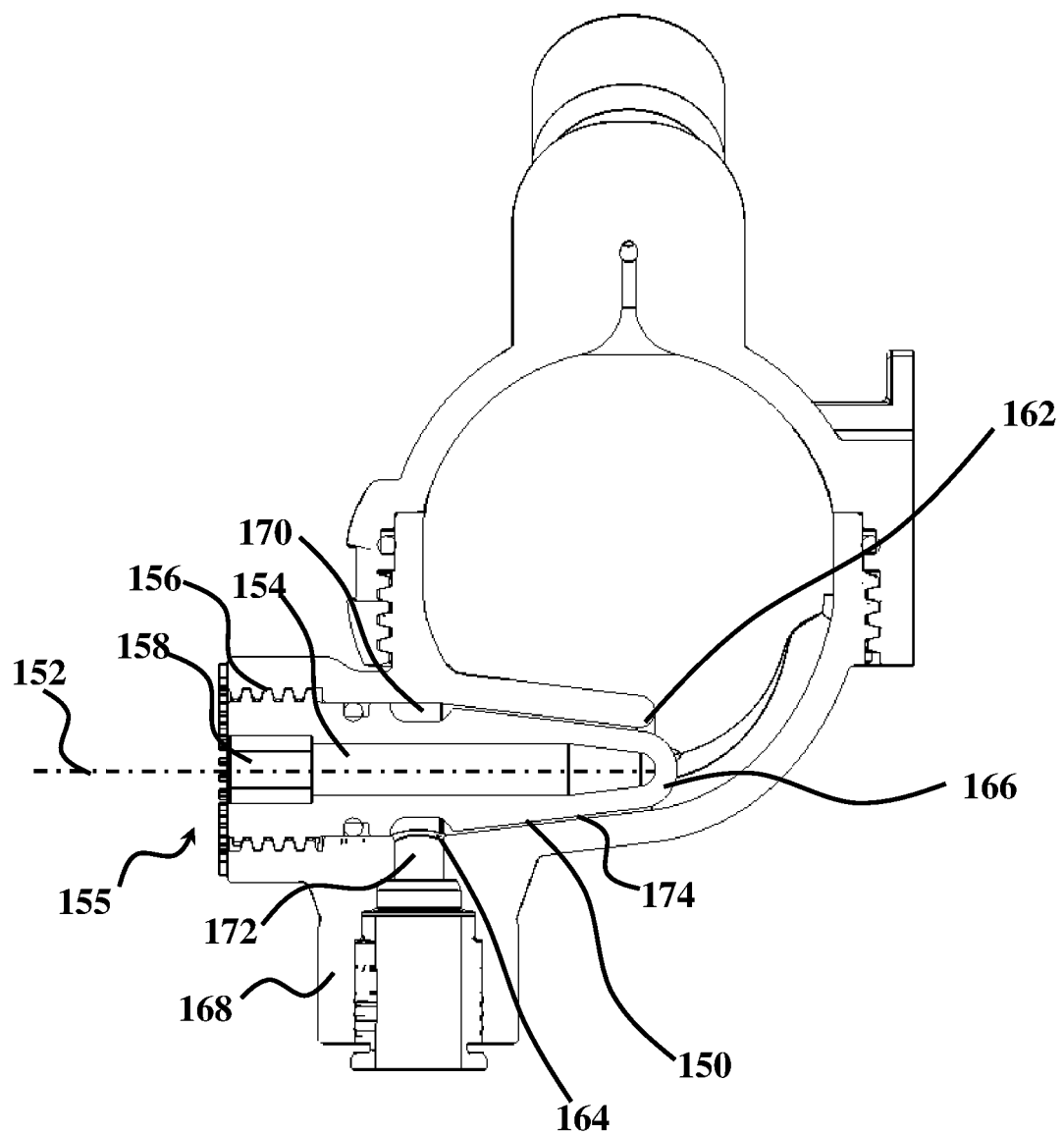
FIGS. 3A and 3B are longitudinal cross-sections along lines III-III in FIGS. 1A and 1B.

Chamber outlet 108 opens into an elongated bore 150 arranged along axis 152 which has a generally tangential orientation to the walls of chamber 102. Fitted into bore 150 is an adjustable valve 155, comprising valve member 154 which is displaceable along axis 152 between a fully advanced position (shown in FIG. 3A) and a retracted one (shown in FIG. 3B). The displacement is through a rotational screw engagements 156 at the rear end of the valve member. The valve member can be rotated through a rear engagement segment 158 which may be linked to an actuation element (not shown) configured to rotate the valve member, that may be a mechanical element such as a user-operable lever, knob, etc.; or a motor, which may be electromechanical, pneumatic, etc. Through such rotation, the valve member 154 may be advanced or retracted within bore 150.

The internal walls 160 of bore 150 diverge from the bore's upstream end 162 (the end adjacent the chamber outlet 108) towards the downstream end 164. The external faces 166 of valve member 154 have a generally frustro-conical shape with faces that generally parallel (follow the contours of) the internal walls of bore 150 which define a valve seat 160. Formed at the downstream end of bore 150 is a unit outlet 168 which is generally normal to axis 152.

Valve member 154 is formed with annular groove 170 which in the fully advanced position (shown in FIG. 3A) is aligned with connecting segment 172 of unit outlet 168; and thus, in the manner to be described below, serves to channel carbonated water to the unit outlet 168.

Figure 3B:
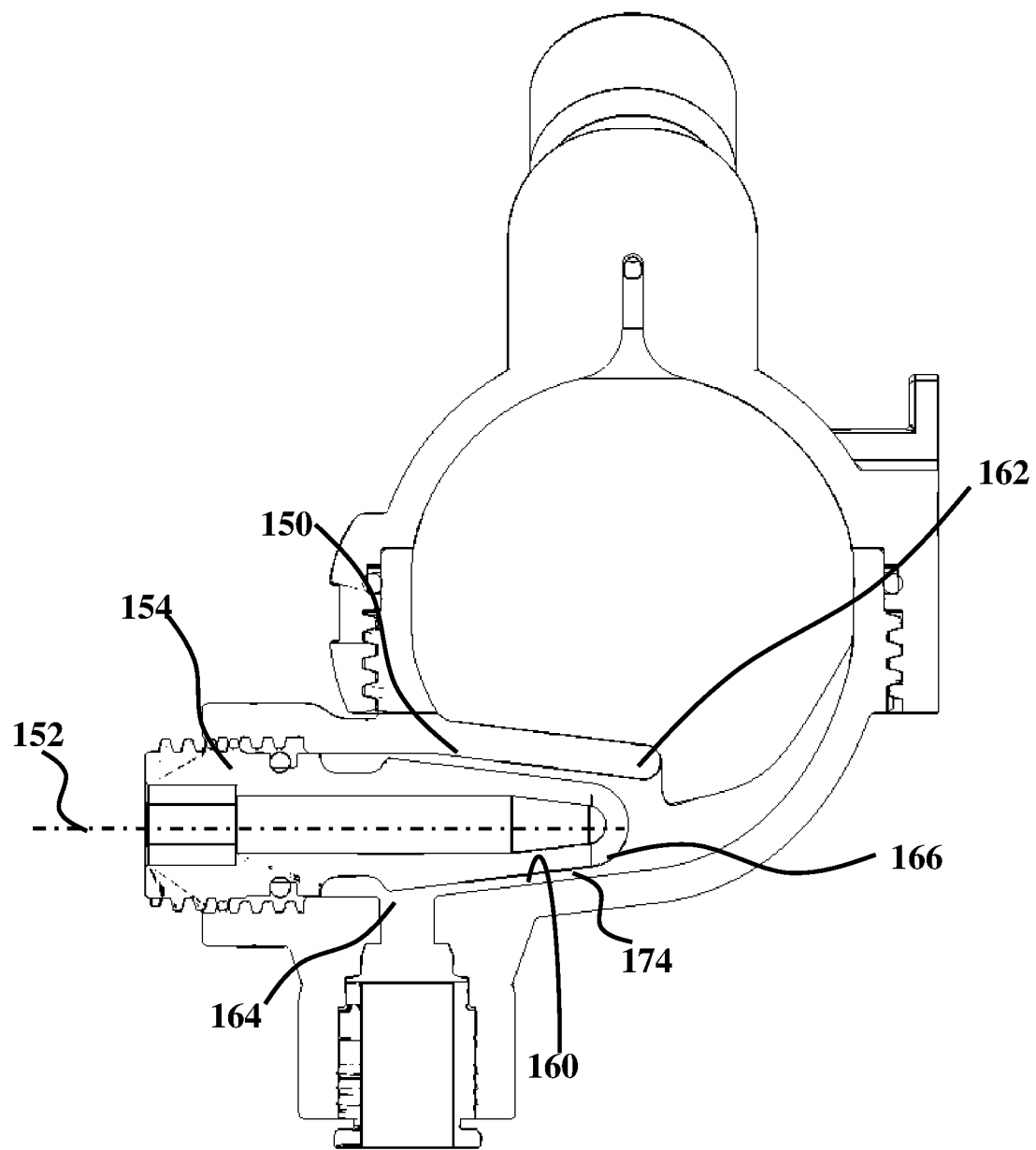

The clearance between the internal walls of valve seat 160 of bore 150 and the external faces 166 of valve member 154 defines a carbonated water conduit 174 linking the chamber outlet and the unit outlet, for the flow of carbonated water from within chamber 102 to annular groove 170 and from there into segment 172. In the advanced position, shown in FIG. 3A, the conduit 174 is narrow and, once the valve member is retracted, as can be seen in FIG. 3B, conduit 174 widens. Through a combination of physical interaction of the egressing carbonated water with the confines of the conduit and the pressure within the mixing chamber that is affected by the width and hence flow resistance of conduit 174, the size of the carbon dioxide bubbles within the egressing carbonated water (and hence the 'strength' of the carbonated water) is adjusted and controlled.

Figure 4:
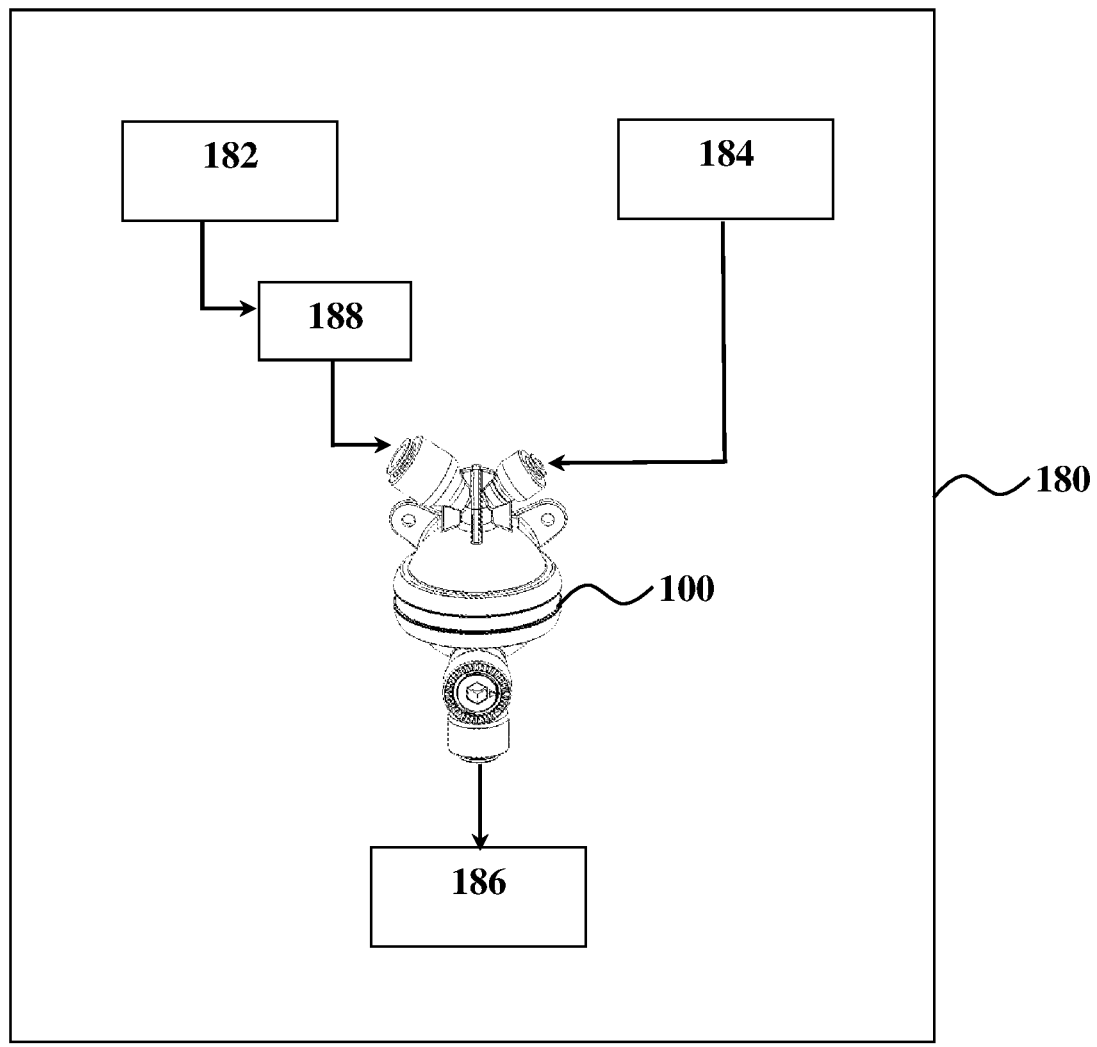
FIG. 4 is a schematic representation of a water dispenser comprising a carbonation unit of this disclosure.

The carbonation technology provided by this disclosure may be embodied in a small carbonation unit suitable for incorporation into a countertop dispensing appliance or may be of a larger size for incorporation into a refrigerator or in a centralized carbonated water dispensing system, etc. Domestic, typically a countertop dispensing appliance, is a specific embodiment for use of such a unit. Such an appliance is shown schematically in FIG. 4. The appliance includes housing 180 linked to a water source 182 which may be a water reservoir or a running water source and includes a pressurized carbon dioxide source 184 typically a pressurized carbon-dioxide canister incorporated into the appliance. The appliance also includes a carbonation unit 100 of the kind described above, linked to a dispensing outlet 186. Disposed in the flow path between the water source 182 and the carbonation unit 100 is, typically, a cooling unit 188 for feeding cooled water into unit 100. The appliance may also include a feed line for feeding non-carbonated water to the dispensing outlet 186 for user selection between regular and carbonated water. By some embodiment, regular (non-carbonated) water may be fed to the dispensing outlet 186 by channeling water through unit 100 without the concomitant introduction of carbon dioxide. The appliance may also include a variety of other elements known per se as well as a user interface for operating and controlling the appliance.

Figure 5A:
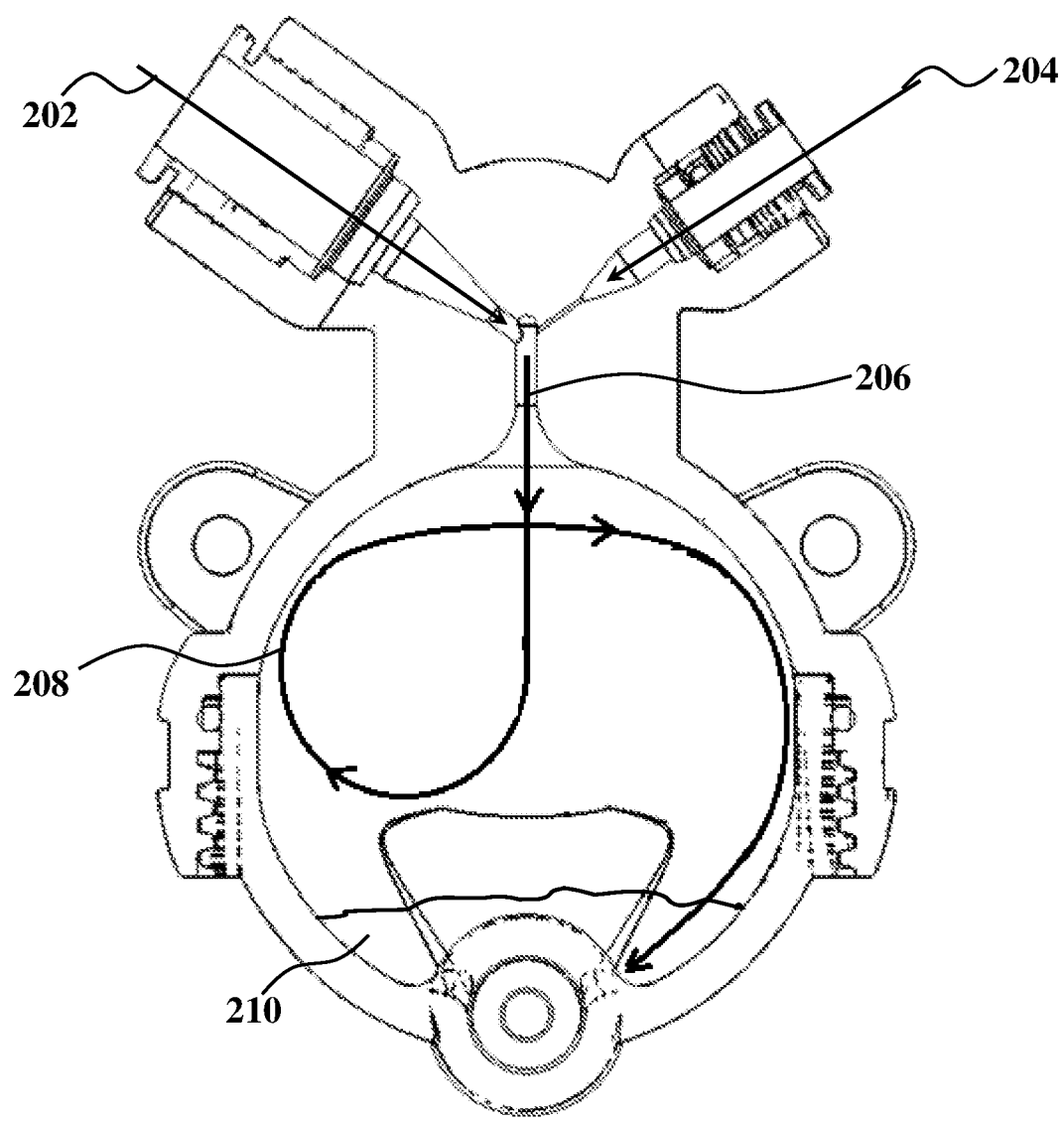
FIGS. 5A and 5B are schemes showing the flow path through the units of FIGS. 3A-3B, respectively, to illustrate an exemplary carbonation process of this disclosure.
Figure 5B:
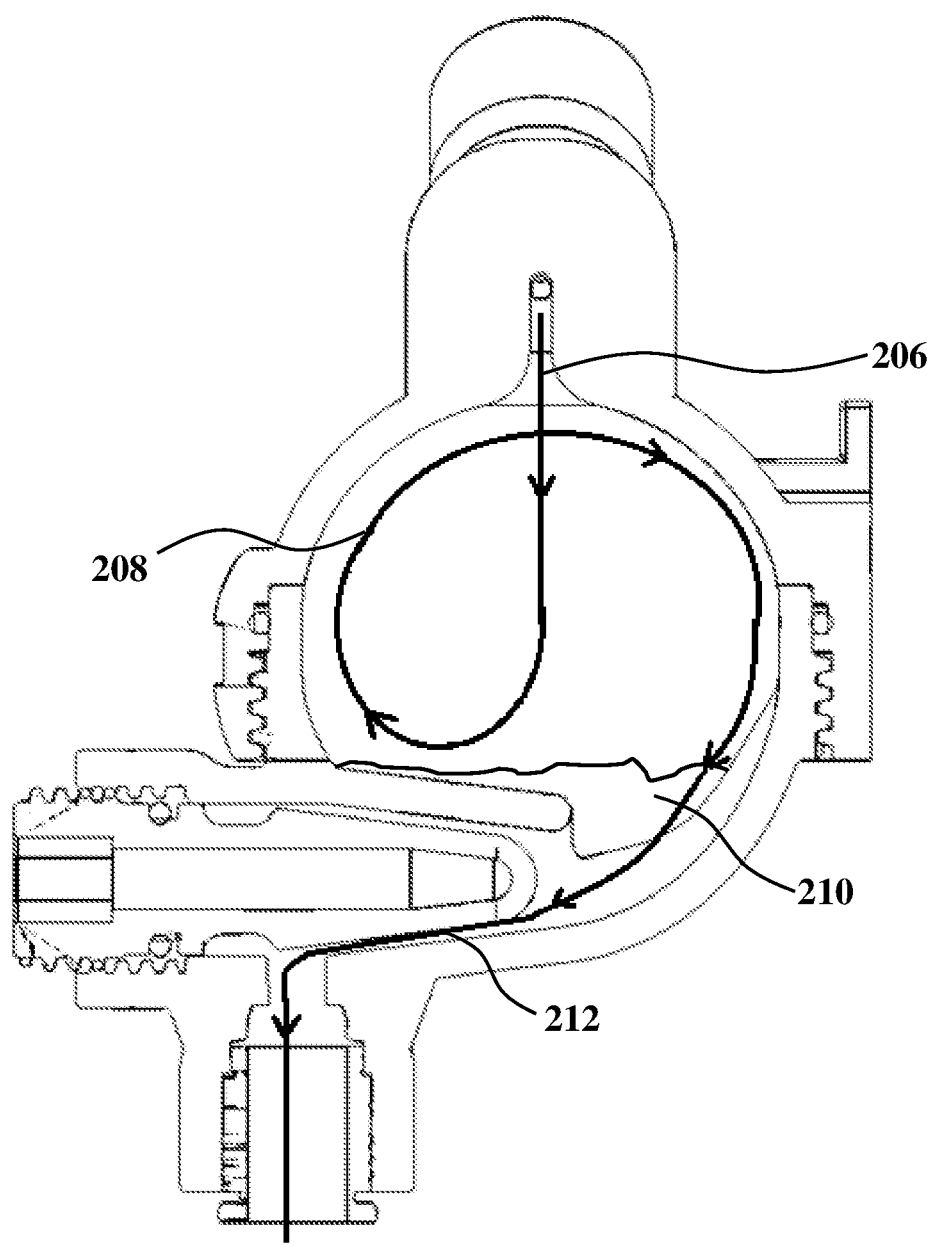

The process for preparation of carbonated water according to an embodiment of this disclosure is exampled by the flow pattern shown in FIG. 5A and 5B. A water stream 202 and pressurized carbon-dioxide stream 204 are concomitantly fed into the merging duct to generate a merged flow 206. This merged flow then ingress the mixing chamber to generate a turbulent flow 208 within the chamber to thoroughly mix the water with the carbon-dioxide to form carbonated water. Pressure within the chamber propels the carbonated water 210 into a flow 212 that egress through a chamber outlet to into the carbonated water conduit. The shear forces while flowing through said conduit and the pressure maintained within the chamber act, in combination, to control the carbonation strength. This process can proceed continuously as long as concomitant water and pressurized carbon-dioxide feeds continues.

Figure 6A:
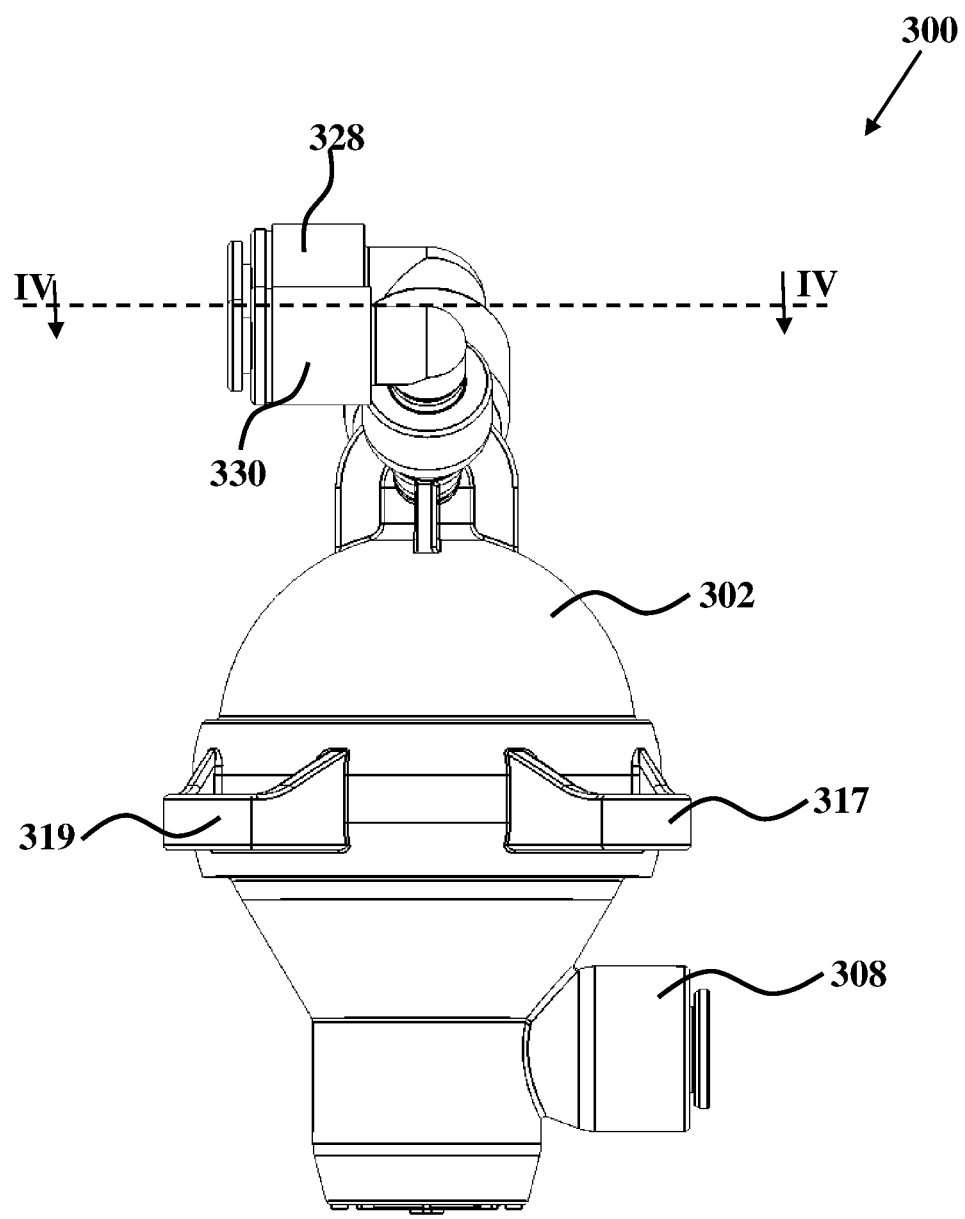
FIGS. 6A and 6B are a side view and a longitudinal cross-section along lines IV-IV, respectively, of a carbonation unit according to another embodiment of this disclosure.
Figure 6B:
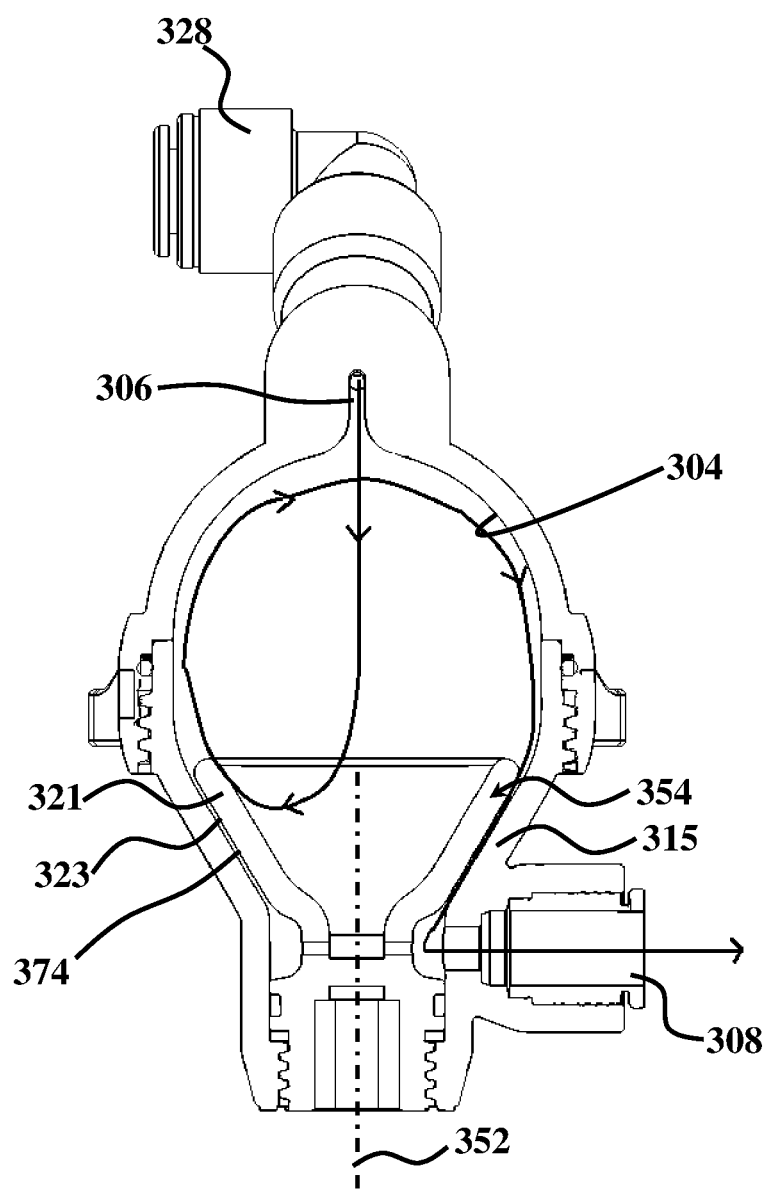

Another exemplary carbonation unit according to this disclosure is shown in FIGS. 6A-6B. Carbonation unit 300 has a mixing chamber 302 with overall spherical internal wall faces 304, similar in its structure to the carbonation unit described in connection with FIGS. 1A-3B, however having an adjustable valve of a different geometry, as will now be explained. Similar to unit 100, carbonation unit 300 is fed from its top by a merging duct 306 and having at its bottom a chamber outlet 308, and is fitted with two lugs 317, 319 for fixing it to the frame of a water dispensing device or system. Also similar to unit 100, the merging duct 306 is in fluid communication with water feed 328 and gas feed 330.

The bottom segment 315 of the carbonation unit 300 is fitted with a valve member 354 which is displaceable along axis 352 between advanced and retracted positions (not shown), similar to the valve member 154 of unit 100. Valve member 354 has a cup-shaped member 321, having a generally conical geometry that matches the internal face of a bottom segment of the carbonation chamber that forms a valve seat 315. Thus, by axially displacing along axis 352, a clearance 374 is formed between the internal faces of valve seat 315 and the external face 323 of cup-shaped member 321, serving to channel carbonated water to outlet 308. As in unit 100, the combination of physical interaction of the egressing carbonated water with the confines of the conduit and the pressure within the mixing chamber that is affected by the width of clearance 374, the size of the carbon dioxide bubbles within the egressing carbonated water is adjusted and controlled.

Figure 7A:
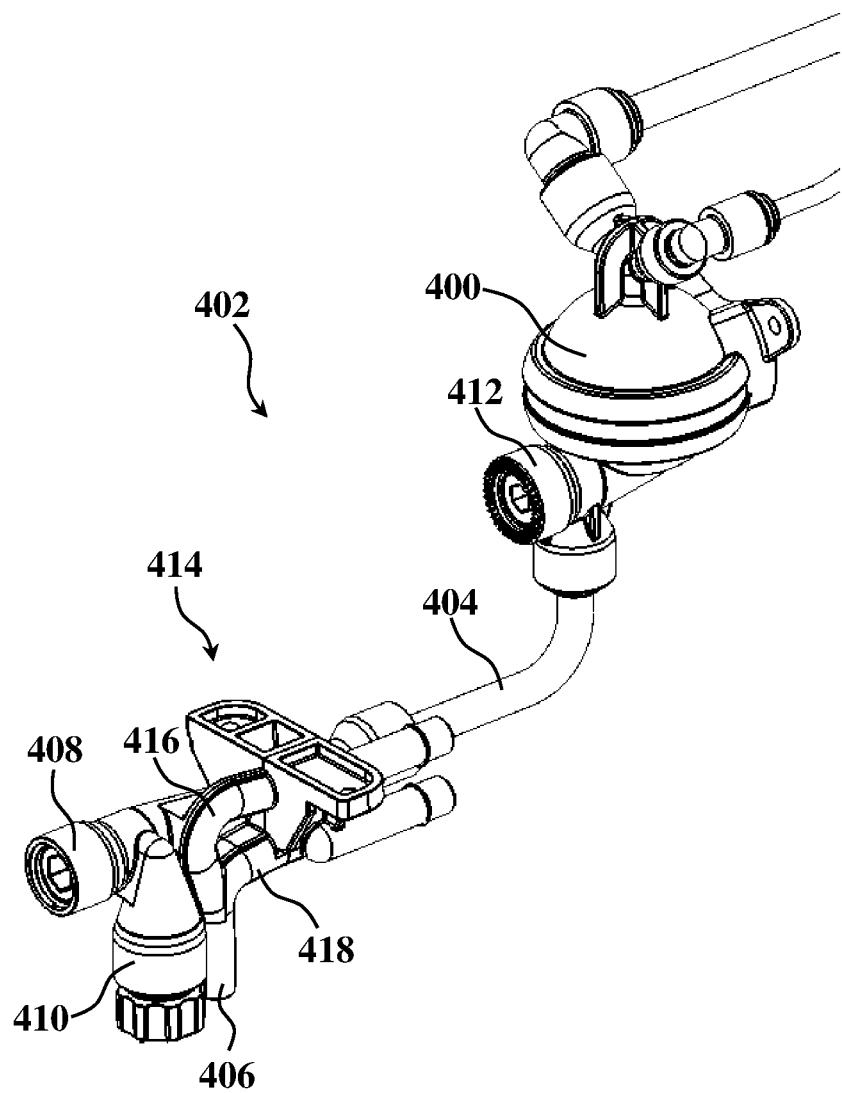
FIGS. 7A and 7B are schematic representation of the dispensing line of a water dispenser comprising a carbonation unit according to a first and a second embodiment of this disclosure, respectively.

An example of the dispensing line in a system comprising the carbonation unit of this disclosure is shown schematically in FIG. 7A. The dispensing line, generally designated 402 includes a carbonation unit 400 of the kind described above, linked to a dispensing outlet 406 via piping 404. In this exemplary system, two auxiliary adjustable valves 408 and 410 are included, permitting a further fine-tuning the carbon dioxide bubbles' size through adjustment of the pressure differential between the carbonation unit outlet and the dispensing outlet, i.e. along the dispensing line 402. These auxiliary adjustable valves may have a structure and function similar to that of valve 412 (which is of the kind of valve 155 described hereinabove).

Although auxiliary valves 408 and 410 are shown in this example to be adjacent the dispensing outlet 406, it is appreciated that one or both of valves 408 and 410 may be positioned anywhere along dispensing line (namely, at any location along piping 404). It is further appreciated that although auxiliary valves are adjustable, it may also be that at least one of the auxiliary valves be a constant valve (i.e. a valve in which the through-flow is pre-adjusted to a constant value).

The system may also include a mixing unit 414, which is linked to feed lines for feeding non-carbonated hot water (not shown) and non-carbonated cold water to the dispensing outlet 406 for user selection between carbonated water and non-carbonated water at a controlled temperature. The mixing unit 414 has a cold water entry port 416 and a hot water entry port 418, such that controlled feeding of cold and hot water and mixing thereof in mixing unit 414 permits dispensing of water at a desired temperature. By some embodiment, cold non-carbonated water may be fed to the mixing unit 414 by channeling water through carbonation unit 400 without the concomitant introduction of carbon dioxide.

Figure 7B:
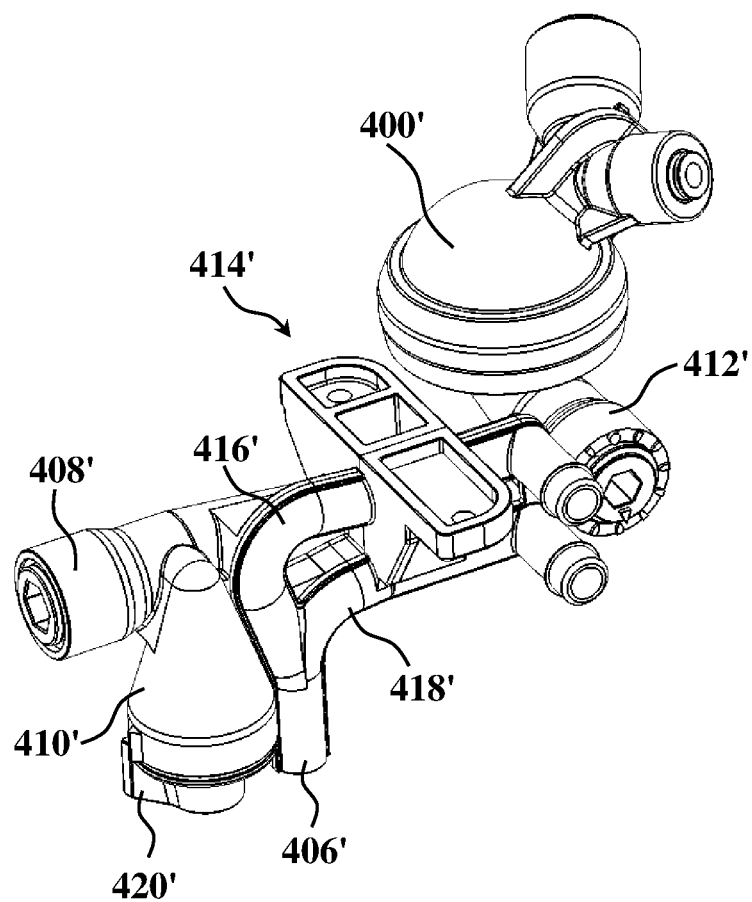

Another exemplary embodiment of the dispensing line in a system comprising the carbonation unit of this disclosure is shown schematically in FIG. 7B. This embodiment is similar to that shown in FIG. 7A, however, without piping 404. Namely, the system shown in FIG. 7B provides a more compact arrangement, in which the carbonation unit 400' is linked and adjacent to a dispensing outlet 406'. As can be seen, the auxiliary adjustable valves 408' and 410' positioned adjacent the dispensing outlet, and adjacent mixing unit 414'. It is of note that adjustable valve 410' may be fitted with a user-operated lever 420', which permits the user to further adjust the strength of carbonation by operating the handle to change the clearance in valve 410' (although in other examples this valve may be controlled by a controller of the dispenser). Due to the proximity of the valves 408' and 410' to the carbonation unit 400', a compact carbonation system is obtained. Also similar to the embodiment of FIG. 7A, mixing unit 414' of FIG. 7B includes cold water entry port 416' and hot water entry port 418' for permitting controlling and dispensing of non-carbonated water at a desired temperature.

The invention claimed is:

1. A water carbonation unit comprising:
   at least one water feed and at least one pressurized carbon-dioxide feed;

a merging duct extending between a first, closed end and a second end, the at least one water feed and at least one carbon-dioxide feed opening into said duct adjacent said first end;

said second end opening into a mixing chamber linked to a carbonated water outlet;

the carbonated water outlet configured to restrict outflow of carbonated water from the chamber to thereby maintain pressure within the chamber while carbonated water flows out of the carbonated water outlet, wherein the mixing chamber has a spherical internal volume defined by spherical internal wall faces, and wherein the curvature of the wall faces is designed to cause turbulence of water and gas in the chamber.

2. The water carbonation unit of claim 1, wherein the merging duct is generally linear.

3. The water carbonation unit of claim 1, wherein the carbonated water outlet comprises a carbonated water conduit that permits (i) buildup and maintenance of gas pressure within the chamber and (ii) continuous egress of carbonated water from the chamber.

4. The water carbonation unit of claim 3, wherein said conduit functions to control the outflow and bubble size of the carbon-dioxide in the carbonated water.

5. The water carbonation unit of claim 1, wherein the carbonated water outlet is fitted with an adjustable valve for adjusting flow therethrough.

6. The water carbonation unit of claim 5, wherein said adjustable valves comprises a valve member disposed within a valve seat and is axially displaceable along an axis to thereby change the width of a clearance formed between external faces of the valve member and internal faces of the valve seat.

7. The water carbonation unit of claim 6, wherein the valve member's external faces have portions that are parallel internal faces of the valve seat.

8. The water carbonation unit of claim 6, comprising
a bore extending along a second axis between an upstream end at the chamber outlet and a downstream end, and
the valve member being fitted into said bore to define a carbonated water conduit between bore walls and outer face of the valve member and axially displaceable along said axis.

9. The water carbonation unit of claim 6, wherein said valve seat is defined by the portion of the chamber adjacent the carbonated water outlet.

10. The water carbonation unit of claim 5, further comprising at least one auxiliary adjustable valve, located downstream to the adjustable valve.

11. The water carbonation unit of claim 1, wherein the merging duct's second end has wall diverging towards the mixing chamber, wherein said diverging walls are rounded and seamlessly merge with walls of said chamber.

12. The water carbonation unit of claim 1, wherein the at least one water feed and at least one pressurized carbon-dioxide feed are each configured to introduce a respective water and carbon dioxide feed in a direction that is angled with respect to the direction of flow of the merged water and carbon-dioxide stream within the merging duct.

13. The water carbonation unit of claim 12, wherein
the merging duct is generally linear to define a first axis,
each of the water and pressurized carbon-dioxide feed has a linear terminal segment, and
the linear terminal segments are each independently angled with respect to the first axis.

14. A continuous water carbonation method comprising, continuously mixing of pressurized carbon-dioxide and water to obtain carbonated water and continuous dispensing the carbonated water;
said mixing comprises
concomitantly introducing water and pressurized carbon-dioxide feeds adjacent a first, closed end of a merging duct and permitting the two feeds to merge and flow from said first end to a second end that opens into a mixing chamber, and
permitting the merged flow to turbulently flow within the mixing chamber, the mixing chamber having a spherical internal volume defined by spherical internal wall faces, wherein a curvature of the wall faces is designed to cause turbulence of water and gas in the chamber; and
said dispensing comprises permitting the carbonated water to egress out of the chamber while maintaining pressure within the chamber.

15. The method of claim 14, wherein the pressure within the chamber propels the carbonated water egress.

16. The method of claim 15, wherein the egressing carbonated water flows through a narrow conduit, wherein said conduit functions to control both the outflow and bubble size of the carbon-dioxide in the carbonated water and/or wherein the dimensions of said conduit may be adjusted to thereby adjust the size of the carbon-dioxide bubbles.

17. The method of claim 14, wherein the pressurized carbon-dioxide decompresses primarily in two stages consisting of a first decompression stage along said merging duct and a second decompression stage in said carbonated water outlet and/or wherein the pressurized carbon dioxide and the water are each independently introduced into the merging duct's at said first end along an axis that is angled to the direction of flow of the merged stream within the merging duct.

18. A water dispenser comprising a carbonation unit of claim 1.

19. The water dispenser of claim 18, comprising at least one auxiliary adjustable valve, located downstream to the carbonation unit.

* * * * *